Jan. 3, 1967   R. R. FULTON   3,295,274
COMBINATION OF POLE ANCHOR WITH A GYM SET OR THE LIKE
Filed Dec. 10, 1964

INVENTOR
Robert R. Fulton

United States Patent Office 3,295,274
Patented Jan. 3, 1967

3,295,274
COMBINATION OF POLE ANCHOR WITH A GYM SET OR THE LIKE
Robert R. Fulton, Sycamore, Ill., assignor to De Kalb Toys, Inc., De Kalb, Ill., a corporation of Illinois
Filed Dec. 10, 1964, Ser. No. 417,337
1 Claim. (Cl. 52—148)

My invention relates to ground anchors designed for securing a pole to the earth, and may be applied to devices known in the art as "gym sets," i.e., play and exercising devices intended primarily for children, such as swings, etc., supported from the ground by an upstanding frame. My invention may also be applied to tent frames, and, in general, for the purpose of rigidifying any pole standing on the ground, especially where such pole is subjected to severe vibration.

It has been common practice to employ for this purpose pegs or stakes which are driven into the ground adjacent the foot of the pole and secured thereto by a flexible connector. Inasmuch as an ordinary stake may readily be dislodged, in some cases an obstruction is arranged on the stake, such as a disc, to inhibit its loosening and withdrawal from the ground. However, to employ a stake having such an obstruction disposed thereon requires that a hole must be dug in the ground adjacent the foot of a pole to be secured, the stake carrying the obstruction is then disposed in the hole and the earth then replaced and packed down around the stake. Such procedure requires time and effort.

An object of my invention is to provide an anchoring stake which will have secured thereon an obstruction which will inhibit inadvertent withdrawal or loosening of the stake from the ground, but at the same time may be driven by screwing action into the ground, even though relatively hard, without the necessity of removing the earth and subsequently replacing it, such anchor being in combination with a pole or frame of a "gym set" or like device subject to high vibration.

More particularly, my invention contemplates securing on a stake in such a combination a generally helical disc which may be literally screwed into the ground, even when hard.

My invention will be best understood by reference to the appended drawings forming a part of this specification and illustrating a preferred embodiment of my invention, wherein, FIG. 1 is a perspective view showing a ground anchor embodying my invention, as employed in the support of a pole, especially one constituting part of a "gym set";

Figures 1, 2, 3, 4:
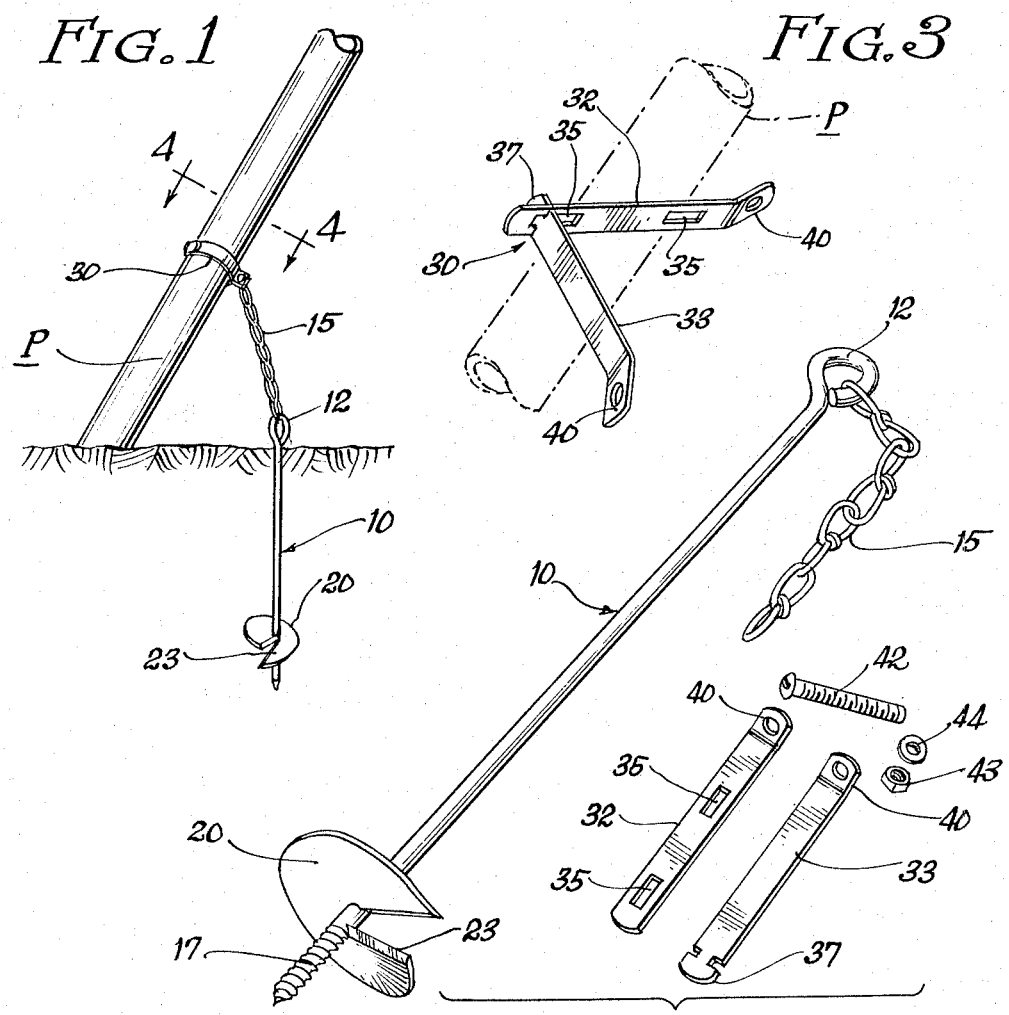
FIG. 2 is a composite perspective view showing the same anchor in combination with the various accessories employed therewith as seen in FIG. 1.
FIG. 3 is a perspective view of a clamping device used as an accessory to the anchor.
FIG. 4 is a sectional view taken substantially along the line 4—4 of FIG. 1.

My improved anchor comprises a stake indicated generally by the numeral 10, preferably formed of iron rod of suitable gauge and length to meet the requirements of the particular installation, and having an eye 12 formed on one end thereof for attachment of a flexible connector 15 which might take the form of a rope, wire cable or chain. The opposite end of stake 10 may be smooth but is preferably threaded as at 17 to facilitate entry into the ground.

Secured to the stake a relatively short distance from the lower end thereof is an obstruction 20, designed to inhibit inadvertent loosening or removal of the stake from the ground. Said obstruction 20 is preferably in the form of a disc having a central perforation for passage of stake 10 therethrough and split, as indicated at 23, and then distorted out of the normal plane of the disc so that it takes the general form of one turn of a helix. Said disc 20 is secured to stake 10 as by soldering, welding or brazing.

While disc 20 need not be of a certain size, it is preferably of a diameter several times that of the stake, and is preferably 3 to 5 times such diameter.

My improved anchor may be attached to a pole P adjacent the foot thereof by any suitable means. However, I have provided an improved clamp 30 comprising a pair of cooperating straps 32, 33, preferably formed of flexible sheet metal, and adapted to be secured together to form a collar encircling pole P, as seen in FIGS. 1 and 4, said pole constituting a structural part of an assembly such as a "gym set."

Strap 32 is provided with a pair of elongated perforations 35, 35 for passage of a generally T-shaped tongue 37 formed on one end of strap 33. A pair of perforations 35 is provided on strap 32 in order that the clamp may be formed in two sizes and thus accommodate poles of different diameters. One end of both straps is bent out of the major plane of the strap and perforated to provide an ear 40, said ears adapted to be mated and secured together by a bolt 42, nut 43 and lock washer 44.

As indicated in FIG. 3, the T-shaped head 37 of strap 33 is inserted in one of the slots 35 of strap 32 and the two straps are then bent around pole P and the free ends of the straps are then secured together as seen clearly in FIGS. 1 and 4.

It will be understood that after the frame or structure, including pole P has been erected, collar 30 will be secured, in the manner just described, to the foot of the pole a relatively short distance above the ground, say a foot or so, with a link of chain 15 encompassing the bolt. Stake 10 is then driven into the ground by a screwing action rather than by a straight driving force. If required, because of the hardness of the ground, a stick of wood or other device may be passed through eye 12 of the stake to serve as a lever to facilitate the screwing action.

In any event, it will be apparent that helical disc 20 will permit penetration of the stake into hard ground without the necessity of digging out the earth and subsequently replacing it, as would be the case if the obstruction 20 were a simple disc or the like.

An anchor embodying my invention may be produced for substantially no greater cost than the less satisfactory devices of the prior art. Much time and effort are saved in the erection of any pole or frame, with my invention.

My invention has been found especially efficient in the erection of frames or structures subject to severe vibration over an extended period of time, making it possible to erect such structures on hard or soft ground and maintaining them firmly erect despite long-continued and severe vibration. This is especially important in connection with playground equipment, to insure the safety of life and limb of children.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claim.

I claim:

In combination with an inclined pole constituting an element of a frame normally subject to severe vibration,
(a) a pole anchor comprising a cylindrical rod provided with an eye at the upper end thereof and a threaded screw portion at the lower end thereof, ending in a ground-penetrating point,
(b) a spiral blade of a diameter several times that of the cylindrical rod affixed to the latter adjacent to the upper terminal of said threaded screw portion and provided with a sharpened radial edge for progressive spiral advance into the ground,
(c) an adjustable collar formed of a pair of flexible sheet-metal straps, one of said straps having a plurality of slots displaced longitudinally from one end thereof and the other one of said straps having a male member at one end thereof for selective interlocking engagement with one of said slots, the opposite end of each of said straps having an opening therein,
(d) a bolt passing through said openings in the straps and clamping the collar onto the pole with a fastening nut, a substantial distance above the foot of the pole engaging the ground, and
(e) a metallic link chain extending between the intermediate portion of said bolt on said collar and the eye at the upper end of said pole anchor.

References Cited by the Examiner

UNITED STATES PATENTS

| | | | |
|---|---|---|---|
| 1,945,932 | 2/1934 | Caley | 248—74 |
| 2,553,883 | 5/1951 | Tinnerman | 248—74 |
| 2,705,121 | 3/1955 | Kaminsky et al. | 52—148 |
| 3,076,532 | 2/1963 | Frye | 52—157 |

FOREIGN PATENTS

| | | |
|---|---|---|
| 171,900 | 9/1916 | Canada. |
| 869,531 | 5/1961 | Great Britain. |

FRANK L. ABBOTT, *Primary Examiner.*

R. S. VERMUT, *Assistant Examiner.*